United States Patent [19]
Park et al.

[11] Patent Number: 5,671,745
[45] Date of Patent: Sep. 30, 1997

[54] DIGITAL SCAN CONVERTER FOR ULTRASONIC SCAN SYSTEM USING UNIFORM LADDER ALGORITHM

[75] Inventors: Yong-heon Park; Jae-sub Hwang, both of Seoul, Rep. of Korea

[73] Assignee: Medison Co., Ltd., Kangwon-Do, Rep. of Korea

[21] Appl. No.: 731,590

[22] Filed: Oct. 16, 1996

[30] Foreign Application Priority Data

Oct. 17, 1995 [KR] Rep. of Korea ............ 95-35820

[51] Int. Cl.$^6$ ............................................. A61B 8/00
[52] U.S. Cl. ............................................. 128/660.07
[58] Field of Search ................. 128/660.01, 660.07, 128/661.01; 342/185; 348/441, 442; 364/731

[56] References Cited

U.S. PATENT DOCUMENTS

| | | | |
|---|---|---|---|
| 4,212,072 | 7/1980 | Huelsman et al. | 364/515 |
| 4,689,675 | 8/1987 | Tchorbajian et al. | 358/140 |
| 4,811,740 | 3/1989 | Ikeda et al. | 128/660.01 |
| 5,325,858 | 7/1994 | Morizumi | 128/660.07 |
| 5,530,450 | 6/1996 | Sohn et al. | 342/185 |

*Primary Examiner*—Francis Jaworski
*Attorney, Agent, or Firm*—Dilworth & Barrese

[57] ABSTRACT

A digital scan converter for an ultrasonic scan system having a plurality of probes, includes a clock generator for generating sampling clock and image display clock corresponding to a currently used probe, a first-in-first-out (FIFO) memory for storing and outputting the data acquired by the currently used probe according to the sampling clock of the clock generator, a controller for calculating a write address and a read address corresponding to the currently used probe and outputting the calculated write address and the read address alternately, a frame memory for storing the data output from the FIFO memory according to the write address of the controller and outputting the stored data according to the read address of the controller and the image display clock of the clock generator, and an address adjustment portion for adjusting the write address output from the controller and supplying the adjusted write address to the frame memory, so that the data acquired by the currently used probe is stored in storage positions designated by a plurality of line addresses corresponding to a single column address in the frame memory and then in storage positions designated by a plurality of line addresses corresponding to the following column address. Thus, desired digital scan conversion can be performed using only a software processing even when there is a frame rate alteration for displaying the altered number of usable probes on a screen.

5 Claims, 2 Drawing Sheets

DIGITAL SCAN CONVERTER FOR ULTRASONIC SCAN SYSTEM USING UNIFORM LADDER ALGORITHM

BACKGROUND OF THE INVENTION

The present invention relates to a digital scan converter for an ultrasonic scan system, and more particularly, to a digital scan converter for an ultrasonic scan system using a uniform ladder algorithm.

Generally, a probe for transmitting and receiving ultrasonic pulses in an ultrasonic scan system converts an echo signal or an ultrasonic signal reflected from a living body into an electrical signal. Also, a digital scan converter therein processes digital data obtained by analog-to-digital conversion of the received echo signal to enable image representation. That is, the digital scan converter stores, in a memory, digital data obtained from ultrasonic waves which have been scanned according to scan modes such as a B-mode, a M-mode, a D-mode and a CD-mode, provided by an ultrasonic scan system, and reads the data stored in the memory according to necessity.

In an ultrasonic scan system for displaying a two-dimensional image, a recording direction to which sampled data of an echo signal acquired by a probe at each scan mode is recorded in a memory, is perpendicular to a reading direction to which the recorded data is read out from the memory, according to a characteristic of the system. That is, the sampled data is sequentially stored for every vertical line of a memory, and is sequentially read out from every horizontal line of the memory when the read data is displayed on a standard display. For this reason, studies for acquiring a two-dimensional image from an echo signal using storage and read-out with respect to a memory have been performed. In acquiring a two-dimensional image of an echo signal, all the specifications of hardware of the digital scan converter are directly involved in a real-time image representation processing factors such as an input data sampling method, a memory size and control method, and an image display clock.

A uniform ladder algorithm (ULA) among two-dimensional image acquiring methods adjusts angles of ultrasonic scan lines so that horizontal distance intervals between the scan lines of respective ultrasonic signals are identical to each other, in order to acquire samples in variable intervals, and records the samples acquired with the variable intervals, in a separate line of a memory for each ultrasonic scan line. Then, the ULA varies a display section and a display interval according to an image display format and an image display sync signal when displaying images. Using the ULA, a position error between a position where an echo signal is generated and that of a sample which is acquired with a variable interval can be minimized. Also, the ULA does not require coordinate transformation and can suppress an increase of hardware such as a memory.

FIG. 1 shows a conventional digital scan converter in an ultrasonic scan system. A central processing unit (CPU) 110 supplies initial information necessary for initialization of the FIG. 1 system to a controller 140 via an interfacer 120. An arbitrator 145 in the controller 140 initializes a motion image X/Y address generator 143 and a still image X/Y address generator 144 in a graphic display controller (GDC) 142, and a write address generator 146 according to the initial information input via an intermediate frequency (IF) processor 141. A sync signal generator 130 generates a frame sync signal /OF, a rate pulse /RP and a vertical sync signal /VSYNC. A sapling clock generator 181 which receives the rate pulse /RP reads stored clock information from a sapling clock store 182 corresponding to a probe selected by the rate pulse /RP, and generates a sapling clock according to the read clock information. The clock output from the sapling clock generator 181 is generated based on the clock information corresponding to a probe selected and supplied from the sapling clock store 182 and is used for sapling an echo signal in an analog-to-digital converter (not shown). The clock information stored in the sampling clock store 182 is made up by the ULA and varied according to a probe of the ultrasonic scan system. For example, when sixteen probes are used in the ultrasonic scan system, the sampling clock stores 182 also individually store clock information corresponding thereto.

A data input portion 160 supplies input data of a selected probe which is obtained by analog-to-digital conversion of an echo signal to a first-in-first-out (FIFO) memory 170, the FIFO memory 170 stores the input data according to a sampling clock supplied from a sampling clock generator 181 and outputs an empty flag involving data storage. The empty flag is supplied to an input buffer 150.

A timing controller 190 receives signals input to the input buffer 150 and a reference signal output from a graphic display controller 142 and generates a memory control signal supplied to a frame memory 230 and an enable signal. If the FIFO memory 170 outputs the stored data to a data distributor 147, the data distributor 147 supplies data output from the FIFO memory 170 to a buffer 220 according to the frame sync signal /OF and the rate pulse /RP which receives via the input buffer 150. For example, a first empty flag is applied from the input buffer 150, the data distributor 147 supplies data output from the first FIFO memory 170 to a first buffer 221. The buffer 220 stores the input data according to an enable signal supplied from the timing controller 190 and supplies the stored data to a frame memory 230.

Meanwhile, the write address generator 146 supplies an X-address being a column address and a Y-address being a line address to the arbitrator 145 so that the data stored in the buffer 220 is stored in the frame memory 230. The arbitrator 145 outputs the received X-address and Y-address to an address buffer 210 so that the input data is stored in the frame memory 230. Here, the timing controller 190 responding to the reference signal output from the graphic display controller 142 supplies an enable signal to the address buffer 210. An X-address buffer 211 and a Y-address buffer 212 stores an X-address and a Y-address at an enabled state by the enable signal supplied from the timing controller 190, respectively. Therefore, the frame memory 230 stores the data supplied from the buffer 220 at a position designated by the X-address and the Y-address applied from the address buffer 210. The data stored in the frame memory 230 is stored in all positions designated by a plurality of the Y-addresses corresponding to a single X-address, and then is stored in the same manner with respect to the following X-address.

An image display clock generator 201 generates an image display clock according to clock information supplied from a particular image display clock information store 202 corresponding to the horizontal sync signal /HSYNC of the graphic display controller 142. Here, the clock information stored in the image display clock information store 202 is individually made up according to a ULA and the number of probes as in the sapling clock store 182.

When the digital data stored in the frame memory 230 is displayed as a motion picture on a screen, the arbitrator 145 judges whether the input data is stored in the FIFO memory 170 based on the empty flag applied via the input buffer 150. If it is judged that the input data has been stored, the arbitrator 145 supplies the X-address and the Y-address generated by the motion X/Y address generator 143 to the address buffer 210. When a still image is displayed on a screen, an X-address and a Y-address generated by a still X/Y address generator 144 instead of the motion X/Y address generator 143 are supplied to the address buffer 210. The frame memory 230 outputs data existing at a position designated by the X-address and the Y-address supplied from the address buffer 210, to a video processor (not shown) according to the image display clock of the image display clock generator 201 and the memory control signal of the timing controller 190. In this case, the frame memory 230 outputs data existing at all positions designated by a plurality of X-addresses corresponding to a single Y-address, and then outputs data in the same manner with respect to a plurality of the X-addresses corresponding to the following Y-address. Thus, an image displayed on the screen can be formed according to an interlaced scan or a sequential scan for a standard display.

The above-described conventional digital scan converter has a structure in which the number of address generators for generating addresses for storing and outputting digital data obtained from an echo signal with respect to a frame memory corresponds to the number of probes. Thus, it is complicate to store the digital data of each probe in every vertical line at the time of storing images, and read the same by every horizontal line at the time of outputting the images. As well, when a capacity of a frame memory is increased or a frame rate of an image is enhanced to use the more number of the probes, or the width between the probe scan lines is increased or decreased, a sampling clock store and an image clock store should be additionally provided or an overall design should be altered.

SUMMARY OF THE INVENTION

To solve the above problem, it is an object of the present invention to provide a digital scan converter for an ultrasonic scan system which can generate control signals for controlling a process which alters data acquired by a probe in the form of real-time two-dimensional image representation, on the basis of initial control information involving the probe.

To accomplish the above object of the present invention, there is provided a digital scan converter for an ultrasonic scan system having a plurality of probes, the digital scan converter comprising:

a clock generator for generating sapling clock and image display clock corresponding to a currently used probe;

a first-in-first-out (FIFO) memory for storing and outputting the data acquired by the currently used probe according to the sampling clock of the clock generator;

a controller for calculating a write address and a read address corresponding to the currently used probe and outputting the calculated write address and the read address alternately;

a frame memory for storing the data output from the FIFO memory according to the write address of the controller and outputting the stored data according to the read address of the controller and the image display clock of the clock generator; and an address adjustment portion for adjusting the write address output from the controller and supplying the adjusted write address to the frame memory, so that the data acquired by the currently used probe is stored in storage positions designated by a plurality of line addresses corresponding to a single column address in the frame memory and then in storage positions designated by a plurality of line addresses corresponding to the following column address.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying drawings.

Figure 1:
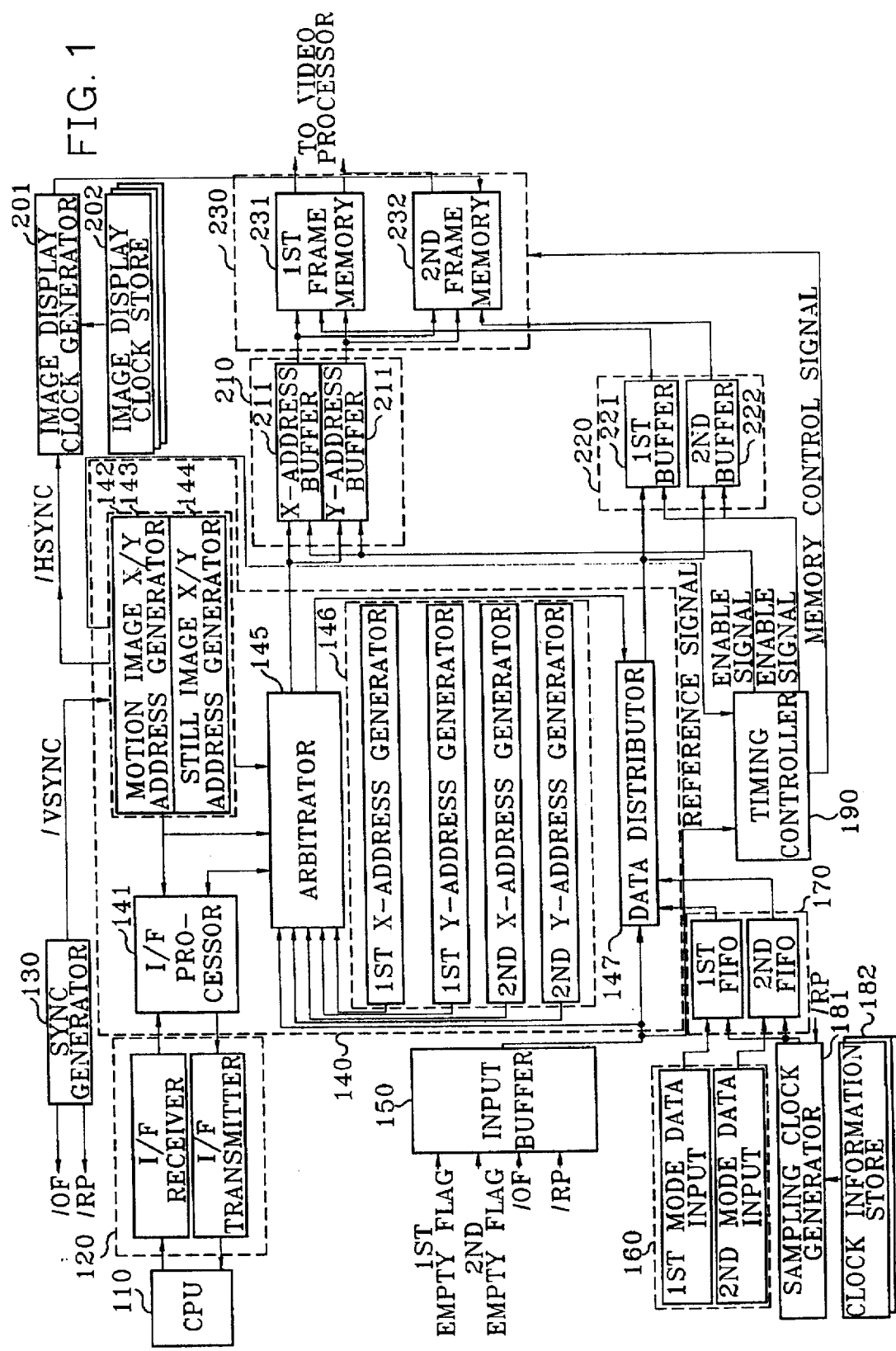
FIG. 1 is a block diagram showing a conventional digital scan converter in an ultrasonic scan system.
Figure 2:
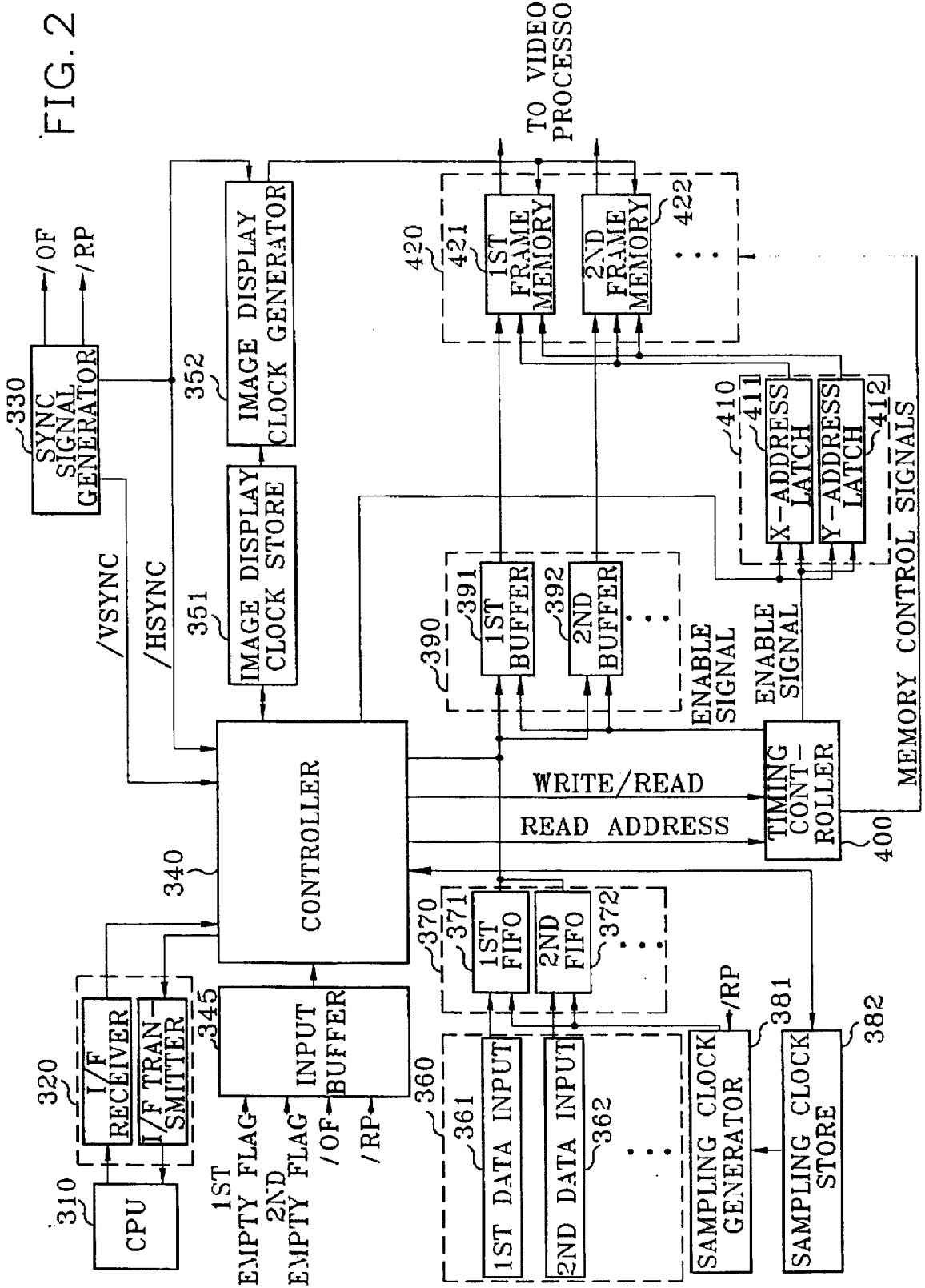
FIG. 2 is a block diagram showing a digital scan converter in an ultrasonic scan system according to a preferred embodiment of the present invention.

FIG. 2 shows a digital scan converter of an ultrasonic scan system using a uniform ladder algorithm according to a preferred embodiment of the present invention. Referring to FIG. 2, a CPU 310 transmits all information necessary for forming a two-dimensional image with an echo signal obtained via a currently used probe to a controller 340 via an interfacer 320 having an intermediate frequency (I/F) transmitter and an I/F receiver. A sync signal generator 330 generates a vertical sync signal /VSYNC, a horizontal sync signal /HSYNC, a frame sync signal /OF and a rate pulse /RP. The controller 340 stores essential information for acquiring a two-dimensional image in an internal memory. The essential information are information received from the CPU 310, that is, staging positions of write addresses and read addresses for a frame memory 420, a memory writing direction corresponding to an ultrasonic scan line, and relative direction and angle interval of each ultrasonic scan line different from the center ultrasonic scan line. The controller 340 is embodied as a digital signal processor DSP, and calculates sampling clock information and image display clock information corresponding to a currently used probe using the information stored in the internal memory. The controller 340 stores the sampling clock information in a sampling clock store 382, and stores the image display clock information in an image display clock store 351. The sampling clock store 382 stores the clock information for the currently used probe and the image display clock store 351 stores the image display clock information for the currently used probe. The sampling clock store 382 and the image display clock store 351 are embodied using a static RAM, respectively, and have a storage capacity of storing the clock information or the image display clock information for the currently used probe, respectively.

A sampling clock generator 381 responding to the rate pulse /RP of the sync signal generator 330 uses the sampling clock information stored in the sampling clock store 382 and generates sampling clock synchronized with the rate pulse /RP. The generated sampling clock is supplied to a FIFO memory portion 370. The FIFO memory portion 370 stores digital data according to analog-to-digital conversion of the echo signal output from a data input portion 360. The data input portion 360 and the FIFO memory portion 370 include the data inputs and the FIFO memories having the same number as that of the probes, respectively. Therefore, digital data is input via a first data input 361 in the data input portion 360, the FIFO memory corresponding to the currently used probe in the FIFO memory portion 370 stores the supplied data therein according to the sampling clock supplied from the sampling clock generator 381, and generates an empty flag representing that there is input data. The generated empty flag is supplied to the controller 340 via an input buffer 345.

The controller 340 continuously checks a frame sync signal /OF output from the sync signal generator 330 and an empty flag output from the FIFO memory portion 370. The controller 340 controls the data stored in the FIFO memory portion 420 to be displayed as an image during the time when the frame sync signal /OF is in a low level state, and controls the digital data input to the FIFO memory portion 370 to be stored in the frame memory portion 420 during the time when the frame sync signal /OF is in a high level state. If an empty flag representing that data is contained in a particular FIFO memory is applied via the input buffer 345 during the time when the frame sync signal /OF is in a high level state, the controller 340 reads the data from the FIFO memory and analyzes header information contained in a preamble of the read data. The header information is composed of the information on the currently used probe and the data quantity information, and is inserted into digital data obtained from the echo signal prior to being supplied to the FIFO memory 370. The controller 340 determines a buffer for storing the output data of the FIFO memory 370, on the basis of the analyzed probe information.

The controller 340 generates a write signal based on the high level signal of the frame sync signal/OF and a write address based on the data quantity information, respectively. The controller 340 generates write addresses, which can store all data in all storage positions of a one vertical line of a frame memory to be used for recording, and then store all data in all storage positions of the following vertical line. That is, the controller 340 generates a plurality of Y-addresses being line addresses with respect to a single X-address being a column address of the frame memory. The timing controller 400 generates an enable signal to be supplied to a data buffer 390 and an address adjuster 410 and a memory control signal to be applied to the frame memory portion 420, in response to the write signal. The data buffer 390 stores and outputs the digital data supplied from the FIFO memory portion 370 in and from a corresponding buffer, respectively. The address adjuster 410 includes an X-address latch 411 and a Y-address buffer 412. The X-address latch 411 latches the X-address applied from the controller 340 and the Y-address buffer 412 stores or outputs the applied Y-address. A particular frame memory write-enabled by the memory control signal of the timing controller 400 among the frame memories in the frame memory portion 420 stores the data supplied from the data buffer 390. For example, when the data obtained by the currently used probe according to analysis of the output data of the FIFO memory portion 370 is soted in a first FIFO memory 371, the data is stored in a first frame memory 421. Then, the first frame memory 421 stores data in all storage positions of all lines belonging to one column, and then stores data in all storage positions of all lines belonging to the following column.

If the frame sync signal/OF becomes a low level state, the controller 340 generates a read address in response to the vertical sync signal /VSYNC and the horizontal sync signal /HSYNC of the sync signal generator 330 and a scan mode signal of the CPU 310. In this case, the controller 340 generates a one fixed Y-address and a plurality of X-addresses so that data stored in a single line of the frame memory can be read with respect to a single horizontal sync signal /HSYNC, and varies the Y-address whenever a horizontal sync signal /HSYNV is applied. When the FIG. 2 apparatus is designed to display an ultrasonic image on an interlaced scan type of standard display, the controller 340 judges whether a current filed is an odd field or an even field based on a vertical sync signal or a horizontal sync signal, and generates a read address so that data can be read according to a corresponding field. The read address generated by the controller 340, that is, the X-address and the Y-address are supplied to the frame memory portion 420 via the timing controller 400.

Meanwhile, the image display clock generator 352 generates image display clock in synchronization with the horizontal sync signal /HSYNC of the sync signal generator 330 using the image display clock information stored in the image display clock store 351, and the image display clock is supplied to the frame memory portion 420. The frame memory portion 420 outputs the stored data according to the memory control signal including the X-address and the Y-address supplied from the timing controller 400 and the image display clock of the image display clock generator 352. The data output from the frame memory portion 420 is transmitted to a video processor (not shown). The frame memories contained in the frame memory portion 420 are embodied using video RAMs (VRAMs) and are refreshed by the controller 340 at a proper time so that data loss can be prevented.

As described above, the data stored in the frame memory portion 420 is output, the controller 340 generates X-addresses and Y-addresses which complete a reading operation with respect to the storage positions of a particular line of the frame memory, and then perform a reading operation of the storage positions of the following line. Thus, the data stored in the frame memory portion 420 is output after being re-numbered in the form of being displayed on the screen.

When the CPU 310 controls the FIG. 2 apparatus so that a still image can be displayed, the controller 340 generates a read address appropriate thereto. Here, such generation of the read address is accomplished when the controller 340 repetitively generates read addresses to be used for reading one-frame data from the frame memory.

In the above-described embodiment, the read address generated by the controller 340 is supplied to the frame memory portion 420 via the timing controller 400. However, it is apparent to a person who is skilled in the art that the read address of the controller 340 can be directly supplied to the frame memory portion 420. Also, although the above-described embodiment has been described in connection with the digital scan converter having the ULA, it is apparent to one skilled in the art that the features of the present invention can be applied to a digital scan converter employing a different method which can represent a signal acquired by a probe into a two-dimensional image.

As described above, the digital scan converter of a digital scan system according to the present invention uses fundamental information for digital scan conversion which is varied according to a probe and converts the data acquired by the probe into a two-dimensional image to be displayed. Therefore, when a probe which can be used in an ultrasonic scan system is added, and/or a frame rate for image representation is varied, the present invention enables digital scan conversion with only software adjustment. Also, since sapling clock information and image display clock information need not be stored in advance for each probe, a memory capacity can be reduced.

While only certain embodiments of the invention have been specifically described herein, it will apparent that numerous modifications may be made thereto without departing from the spirit and scope of the invention.

What is claimed is:

1. A digital scan converter for an ultrasonic scan system having a plurality of probes, the digital scan converter comprising:
- a clock generator for generating sampling clock and image display clock corresponding to a currently used probe;
- a first-in-first-out (FIFO) memory for storing and outputting the data acquired by the currently used probe according to the sampling clock of said clock generator;
- a controller for calculating a write address and a read address corresponding to the currently used probe and outputting the calculated write address and the read address alternately;
- a frame memory for storing the data output from said FIFO memory according to the write address of said controller and outputting the stored data according to the read address of said controller and the image display clock of said clock generator; and
- an address adjustment portion for adjusting the write address output from said controller and supplying the adjusted write address to said frame memory, so that the data acquired by the currently used probe is stored in storage positions designated by a plurality of line addresses corresponding to a single column address in said frame memory, and then in storage positions designated by a plurality of line addresses corresponding to the following column address.

2. The digital scan converter according to claim 1, wherein said clock generator comprises a sampling clock store for storing sampling clock information, and a sampling clock generator for generating sapling clock according to the sampling clock information stored in said sapling clock store,
wherein said controller calculates said sampling clock information by using information for digital scan conversion of the data acquired by said currently used probe.

3. The digital scan converter according to claim 1, wherein said clock generator comprises an image display clock store for storing image display clock information, and an image display clock generator for generating image display clock using the image display clock information of said image display clock store,
wherein said controller comprises a sync signal generator for generating a vertical sync signal and a horizontal sync signal for image representation, and a calculator for calculating said image display clock information, by using the information for digital scan conversion of the data acquired by the currently used probe, said vertical sync signal and said horizontal sync signal.

4. The digital scan converter according to claim 1, wherein said controller comprises:
- a central processing unit (CPU) for generating information involving data acquisition from said currently used probe, and initial values of the write and read addresses of said frame memory;
- a sync signal generator for generating a vertical sync signal and a horizontal sync signal for image representation; and
- a digital signal processor for generating the write and read addresses using the data generated by said CPU, data quantity information contained in the data output from said FIFO memory, and said vertical and horizontal sync signals, and calculating information involving generation of the sampling clock and the image display clock.

5. The digital scan converter according to claim 4, wherein said address adjustment portion comprises a latch for latching a particular column address corresponding to a plurality of line addresses in said frame memory, until all of said plurality of the line addresses are supplied to said frame memory.

* * * * *